Patented Nov. 5, 1946

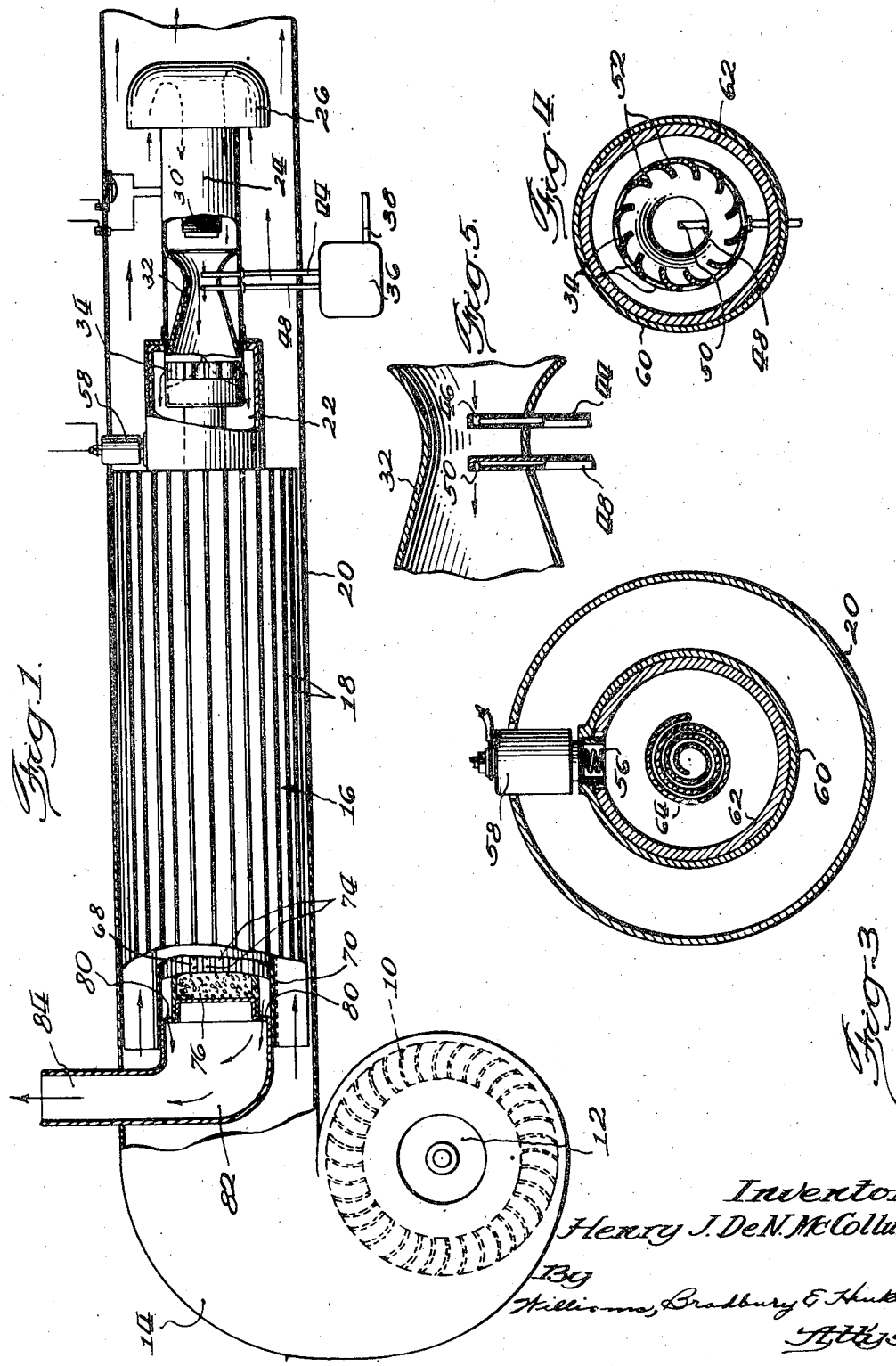

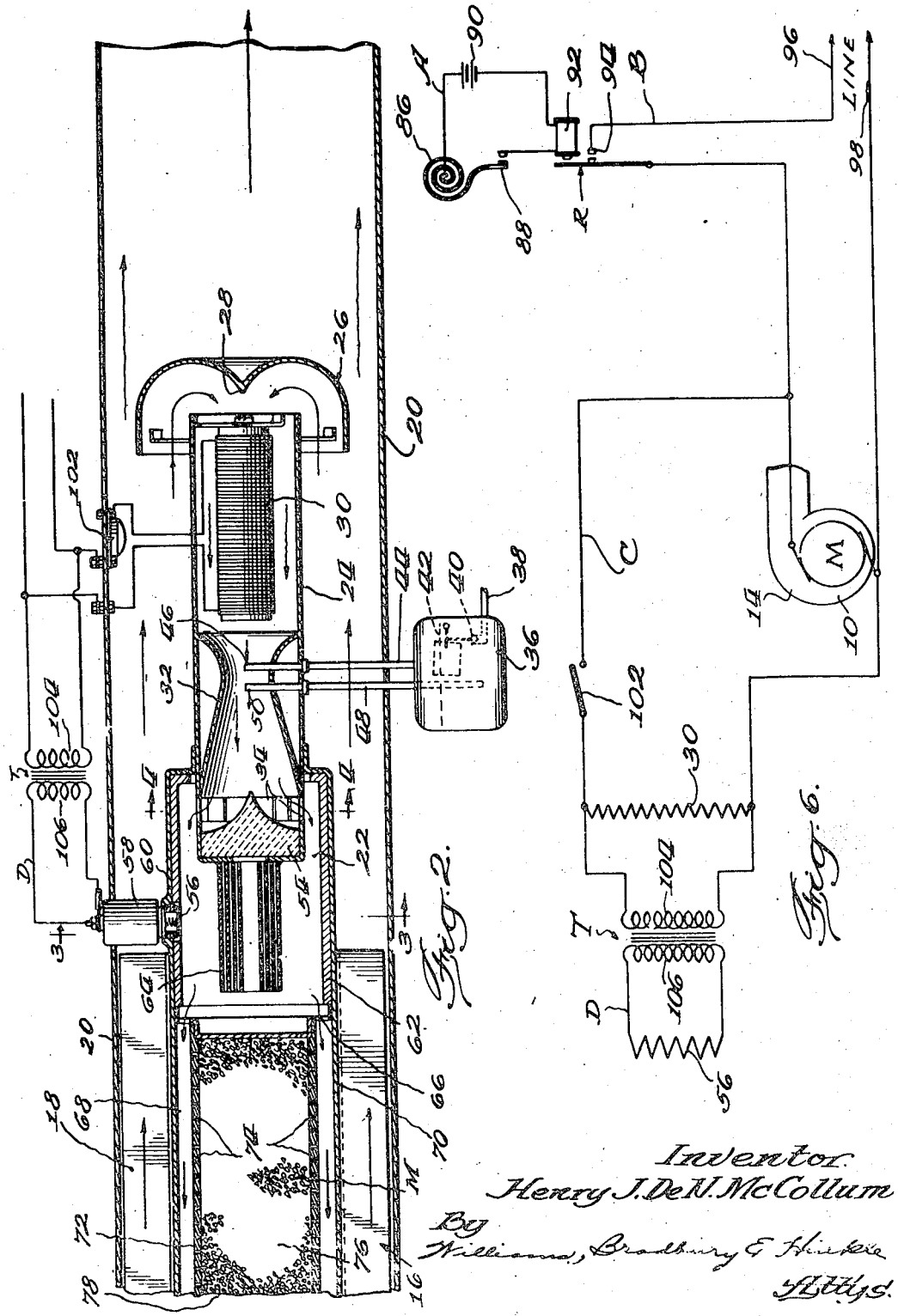

2,410,547

UNITED STATES PATENT OFFICE

2,410,547

HEATING APPARATUS

Henry J. De N. McCollum, Chicago, Ill.; Thelma McCollum executrix of said Henry J. De N. McCollum, deceased Application April 3, 1942, Serial No. 437,557

9 Claims. (Cl. 126—110)

My invention pertains to heating apparatus adapted for a wide variety of uses.

An object of my invention is to provide a simple, compact and inexpensive heating apparatus which can be utilized to heat the interior of homes, office buildings, buses, street and railway cars, airplanes, or any other space which it may be desired to heat.

Another object of my invention is to provide a heating apparatus having the foregoing advantages and which is capable of operating on fuel oil.

Another object of my invention is to provide a heating apparatus wherein a single motor furnishes all of the power necessary to accomplish all of the objects of the apparatus.

Another object of my invention is to provide a heating apparatus wherein the air supplied to the burner is preheated by the same heat exchanger which heats the air supplied to the room or other space whose temperature is to be raised.

Another object of my invention is to provide a heating apparatus having a minimum number of moving parts.

Another object of my invention is to provide a heating apparatus which is more compact and efficient than those heretofore used.

Other objects and advantages will become apparent as the description proceeds.

In the drawings:

Fig. 1 is a side elevation, partly in section, illustrating an embodiment of my invention;

Fig. 2 is an enlarged vertical section through the burner and associated parts shown in Fig. 1;

Fig. 3 is a transverse section taken on the line 3—3 of Fig. 2;

Fig. 4 is a partial transverse section taken on the line 4—4 of Fig. 2;

Fig. 5 is an enlarged view of the throat portion of the Venturi tube; and

Fig. 6 is a wiring diagram illustrating the electrical connections.

My improved heating apparatus has a single motor driven fan 10, provided with an air inlet 12, through which air from the space to be heated, or from the outside atmosphere, or partly from both of these sources, is admitted to the fan and discharged into the curved passageway 14 leading to the heat exchanger 16. This heat exchanger is provided with longitudinally extending fins 18, whose outer edges are spaced slightly from the interior wall of the air duct 20 so that the air passing the heat exchanger 16 comes in intimate heat exchanging contact with the fins 18.

The air discharged by the fan 10 next passes around the combustion chamber 22 and thence past the air inlet tube 24 for the burner. Part of the air discharged by the fan 10 enters the cup-shaped scoop 26, which forms the air inlet for the burner, and the rest of the air discharged by the fan 10 continues along the air duct 20 to the interior of the space to be heated or to further ducts leading to such space or spaces.

The scoop 26 is generally cup-shaped, as clearly shown in Fig. 2 of the drawings and its bottom is indented, as indicated at 28, better to reverse the direction of the air caught thereby. This reversed air passes into the righthand end of the burner inlet tube 24 and over electrical heating coil 30 arranged therein. This air next enters a Venturi tube 32, which discharges through openings 34 leading to combustion chamber 22.

I preferably provide a float bowl 36, which is connected by pipe 38 with a tank or other suitable source of fuel oil. Where the heating apparatus is utilized to heat the interior of a vehicle, this source may be either a separate tank for the heating apparatus or may be the tank holding the fuel oil used in operating a Diesel engine to drive the vehicle. The admission of fuel oil to the float bowl 36 is regulated by the usual float control valve 40, which functions to maintain the fuel at approximately the level indicated by the line 42.

The pressure pipe 44 has its lower end opening into the top of the float bowl 36 and has its upper end extending into the throat of the Venturi tube 32. This pipe 44 has an opening 46 facing directly toward the stream of air entering this throat so that this air tends to enter the opening 46 and flow down the pipe 44, thereby creating a pressure in the float bowl 36. A suction or fuel discharge pipe 48 has its lower end terminating in the float bowl 36 well below the minimum level of fuel therein. The upper end of the suction pipe 48 extends into the throat of the Venturi tube 32 and has an opening 50 facing in the direction of air flow, so that the suction existing in this throat draws fuel upwardly through the pipe 48.

The fuel discharged into the interior of the Venturi tube 32 from pipe 48 and opening 50 mixes with the air flowing through this Venturi tube and this mixture passes through openings 34 into combustion chamber 32. As best shown in Fig. 4, the openings 34 are formed by punching fingers 52 out of the sheet metal of which tube 24 is formed. These fingers are preferably bent into the curved shape illustrated in the drawings. The purpose of this construction is to give a whirling motion to the mixture of fuel and air as it enters the combustion chamber thus producing a more intimate and uniform mixture thereof. The tube 24 to the left of openings 34 is closed by a ceramic block 54, having a generally conical surface facing toward the outlet of the Venturi tube and cooperating therewith to direct the mixture of fuel and air outwardly through the openings 34.

The combustible mixture entering the combustion chamber 22 is ignited by a hot wire igniter 56 mounted into a plug 58 having threaded engagement with the metal wall 60 of the combustion chamber. This metal wall is preferably provided with a refractory sleeve or lining 62. A reigniter 64 made of "inconel" metal or other suitable material is attached to the end of tube 24 and serves to maintain combustion of gases in the combustion chamber after the igniter 56 has been disconnected from its source of electrical energy.

The burned gases from the combustion chamber pass through opening 66 into the annular passageway 68 formed by the sleeves 70 and 72. The sleeve 72 is preferably formed of copper or other suitable material and forms part of a muffler M. A plurality of openings 74 are arranged lengthwise of the muffler and establish restricted communication between the annular passageway 68 and the chamber 76 which is preferably filled with a non-corrosive metallic wool 78.

As the burned gases travel the length of annular passageway 68, they give up their heat which is transferred by sleeve 70 and fins 18 to the air forced thereover by the fan 10. At the same time, the muffler M forming part of this heat exchanger absorbs any noise entrained in the burned gases so that the operation of my novel heating apparatus is quiet and unobjectionable from a noise standpoint.

At the left-hand end of the passageway 68, the burned gases flow through openings 80 to an exhaust manifold 82 having a discharge pipe 84 which may discharge directly into the atmosphere outside of a vehicle body when my heating apparatus is utilized to heat the passenger compartment of a vehicle. When my heating apparatus is utilized to heat homes or office buildings, the pipe 84 will usually be connected to a chimney through which the burned gases are finally discharged to atmosphere.

In Fig. 6, I have illustrated a wiring diagram showing a typical installation of my heating apparatus where this heating apparatus is utilized to heat the interior of a home or office building. In this wiring diagram, the usual room thermostat 86 controls a switch 88 in a circuit A containing a battery 90 and electromagnet 92 forming part of a relay R. When the temperature in the space containing the thermostat 86 drops below the temperature for which this thermostat is set, the thermostat closes switch 88 thereby energizing electromagnet 92 and closing relay switch 94 in a circuit B connected by leads 96 and 98 to the commercial power line supplying electricity for light and other purposes to the building.

The circuit B also includes an electric motor M for driving the fan 10, and in parallel with this motor is a further circuit C containing a temperature-responsive switch 102. This switch 102 may have a bimetallic switch blade or may be of any other conventional or suitable construction and is mounted on the inner wall of the air duct 20, as clearly shown in Fig. 2. The circuit C also includes the electrical heating coil 30 and the primary winding 104 of a transformer T having a secondary winding 106 in a circuit D which includes the hot wire igniter 56.

In the operation of that form of my invention illustrated in the drawings, the thermostat 86 may be set for any temperature which it is desired to maintain in the home or other space which is heated by my heating apparatus. When the temperature of this space falls below the desired temperature, the thermostat 86 closes switch 88 energizing relay R and closing the circuit to the electrical motor M, thereby starting operation of the fan 10. At this time, the thermostatic switch 102 would be closed so that closing of the switch 94 forming part of the relay R would also energize electrical heating coil 30, transformer T, and hot wire igniter 56.

The air discharged by the fan 10 flows lengthwise of the heat exchanger 16 which is cold when the apparatus is first started and therefore does not impart any heat to the air. Part of the air discharged by the fan is caught by the scoop 26 and flows over electrical heating coil 30 where its temperature would be raised sufficiently to produce a combustible mixture when mixed with the fuel oil. The air heated by coil 30 then passes into Venturi tube 32 and creates sufficient differential pressure in orifices 46 and 50 to raise fuel from the float bowl 36. This fuel mixes with the heated air in the Venturi tube 32 and this mixture is discharged through orifices 44 into the combustion chamber. The orifices 34 create a whirling motion of the air and fuel mixture and serve further to mix the fuel and air in more intimate contact, and to form a thoroughly combustible mixture which is ignited by the hot wire igniter 56.

The burned gases flow through orifices 66 along annular passageway 68 and give up their heat to the incoming air forced over the heat exchanger by the fan 10. At the same time, the muffler M absorbs any sound entrained in the burned gases so that the operation of the heating apparatus is substantially noiseless except for such slight sound as may be produced by the operation of the motor 12 and fan 10. The burned gases then pass through openings 80 into exhaust manifold 82 and are discharged through pipe 84 either directly to atmosphere or through the usual chimney.

That portion of the air in duct 20 which is not caught by scoop 26 passes to the space or spaces whose temperature is to be raised. It will be understood that the fan inlet 12 may communicate directly with atmosphere, or may communicate with the room or other space to be heated, or may communicate with both through a shutter arrangement so that the fan can draw in all fresh air or all room air, or any desired proportions of both.

The continued operation of the burner heats up the heat exchanger 16 so that the air discharged from the fan 10 is heated as it passes over this interchanger. As soon as the interchanger 16 reaches operating temperature, the air blown thereover by fan 10 will be heated sufficiently to cause thermostatic switch 102 to open and break the circuit to the heating coil 30 and igniter 56. By this time, the reigniter 64 will have reached a sufficiently high temperature to insure continued ignition of the combustible mixture in the combustion chamber 22. After the heating coil 30 and igniter 56 have been cut out by opening of the thermostatic switch 102, the only current consumed by the heating apparatus is that required to drive the motor M.

Where my heating apparatus is utilized to heat the interior of a bus or other vehicle, it may not be desirable to drive the fan 10 by an electric motor. Under such circumstances, the fan 10 can be driven by a separate internal combustion engine or through a belt or geared connection with the engine which drives the bus. Under these conditions, the heating coil 30 and igniter 56 would usually be connected to operate from the electrical circuit of the vehicle although a special generator could be provided for the coil 30 and igniter 56 if this should prove to be more desirable.

While I have illustrated only a single embodiment of my invention, it is to be understood that my invention may assume numerous forms and that the scope of my invention is defined by the following claims.

I claim:

1. A heating apparatus comprising a single fan, a straight duct receiving air discharged by said fan, a scoop for catching and reversing the direction of flow of some of the air discharged by said fan through said duct, a Venturi tube through which such reversed air flows, differential pressure means operated by air flow through said tube for supplying fuel to said Venturi tube, a combustion chamber communicating with the discharge end of said Venturi tube, heat exchange means receiving burned gases from said combustion chamber, said Venturi tube, combustion chamber, and heat exchange means being located in said duct between said fan and scoop, and ignition means for said combustion chamber.

2. A heating apparatus comprising a fan, a straight duct receiving air discharged by said fan, a scoop for catching and reversing the direction of flow of some of the air discharged by said fan through said duct, a carburetor through which such reversed air flows, means for supplying fuel oil to said carburetor, a combustion chamber communicating with the discharge end of said carburetor, heat exchange means receiving burned gases from said combustion chamber, said carburetor, combustion chamber, and heat exchange means being located in said duct between said fan and scoop, and ignition means for said combustion chamber.

3. A heating apparatus of the class described comprising a fan, a straight duct receiving air discharged by said fan, and means in said duct for conducting a counterflow of gases therein, said last-named means including a scoop for reversing the flow of part of the air discharged by said fan, a heating coil for heating the reversed air, carbureting means for mixing the reversed air with fuel, a combustion chamber wherein the combustible mixture supplied by said carbureting means is burned, and heat exchange means for transferring heat from gases discharged from said combustion chamber to air discharged by said fan, said heating coil, combustion chamber and heat exchange means being located between said fan and scoop.

4. A heating apparatus of the class described comprising a fan, a straight duct receiving air discharged by said fan, and means in said duct for conducting a counterflow of gases therein, said last-named means including means for reversing the flow of part of the air discharged by said fan, a heating coil for heating the reversed air, a thermostatic control for said coil, carbureting means for mixing the reversed air with fuel, a combustion chamber wherein the combustible mixture supplied by said carbureting means is burned, and heat exchange means for transferring heat from gases discharged from said combustion chamber to air discharged by said fan, said heating coil, carbureting means, combustion chamber and heat exchange means being located between said fan and flow reversing means.

5. A heating apparatus of the class described comprising a duct, means for blowing air through said straight duct, a carburetor in said duct, a combustion chamber in said duct connected to said carburetor to receive a combustible mixture therefrom, heat exchange means in said duct, said heat exchange means being heated by burned gases from said combustion chamber, silencing means in said duct for silencing noise entrained in said gases, said silencing means having a wall adjacent said heat exchange means and cooperating therewith to confine flow of hot gases along the walls of said heat exchange means, and means downstream of said carburetor, combustion chamber and heat exchange means for reversing the flow of part of the air flowing in said duct and creating a counterflow of fluid through said carburetor, combustion chamber and heat exchange means.

6. Heating apparatus of the class described comprising a straight duct, means for blowing air through said duct, a carburetor in said duct, a combustion chamber in said duct and connected to said carburetor to receive a combustible mixture therefrom, heat exchange means in said duct, said heat exchange means being heated by burned gases from said combustion chamber, silencing means in said heat exchange means, said silencing means having a wall closely adjacent a wall of said heat exchanger whereby the flow of hot gases along the wall of said heat exchanger is closely confined to said last named wall, and means downstream of said carburetor, combustion chamber, heat exchange means and silencing means for reversing the flow of part of the air flowing in said duct and creating a counterflow of fluid through said carburetor, combustion chamber, and heat exchange means.

7. A heating apparatus comprising a single fan, a straight duct receiving air discharged by said fan, a scoop for catching and reversing the direction of flow of some of the air discharged by said fan through said duct, a Venturi tube through which such reversed air flows, differential pressure means for supplying fuel to said Venturi tube, a combustion chamber communicating with the discharge end of said Venturi tube, heat exchange means receiving burned gases from said combustion chamber, said Venturi tube combustion chamber and heat exchange means being located in said duct, ignition means for said combustion chamber, means for rendering said last-named means inoperative, and re-ignition means for said combustion chamber.

8. A heating apparatus of the class described comprising a fan, a straight discharge duct therefor, a carburetor located in said duct and operated by air discharged from said fan to mix a portion of said air with fuel oil to form a combustible mixture, pre-heating means for air flowing to said carburetor, a combustion chamber communicating with said carburetor, heat exchange means communicating with said combustion chamber, means for directing part of the air discharged by said fan into said carburetor for reverse flow therethrough, and a cutout for said preheating means, said carburetor pre-heating means and heat exchange means being located between said fan and said directing means.

9. A heating apparatus of the class described comprising a straight duct, means for blowing air through said duct, a carburetor in said duct, a combustion chamber in said duct, mixing means connecting said carburetor and chamber, heat exchange means in said duct, said heat exchange means being heated by burned gases from said combustion chamber, silencing means in said duct for silencing noise entrained in said gases, said silencing means having a wall closely adjacent a wall of said heat exchanger whereby the flow of hot gases along the wall of said heat exchanger is closely confined to said last named wall, and means for reversing the flow of part of the air flowing in said duct and creating a counterflow of fluid through said carburetor, mixing means, combustion chamber and heat exchanger.

HENRY J. DE N. McCOLLUM.